United States Patent
Wang

(10) Patent No.: US 6,298,447 B1
(45) Date of Patent: *Oct. 2, 2001

(54) SECURITY CONTROL FOR COMPUTER POWER SUPPLY SYSTEM

(75) Inventor: Cheng-Chih Wang, Hsinchu Hsien (TW)

(73) Assignee: Winbond Electronics Corporation, Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 09/118,895

(22) Filed: Jul. 20, 1998

Related U.S. Application Data

(63) Continuation-in-part of application No. 08/886,009, filed on Jun. 30, 1997, now Pat. No. 6,041,413.

(51) Int. Cl.$^7$ .................................................. H04K 1/00
(52) U.S. Cl. ........................ 713/202; 713/300; 713/310; 713/320
(58) Field of Search .................................. 713/189, 202, 713/310, 200, 201, 313, 193, 300, 320; 714/241; 340/825.34, 825.31; 324/178

(56) References Cited

U.S. PATENT DOCUMENTS

| | | | |
|---|---|---|---|
| 4,905,281 | * 2/1990 | Surjaatmadja et al. | 713/202 |
| 4,959,860 | * 9/1990 | Watters et al. | 713/202 |
| 5,446,906 | * 8/1995 | Kardach et al. | 713/323 |
| 5,486,725 | 1/1996 | Keizer et al. | 307/116 |
| 5,537,544 | 7/1996 | Morisawa et al. . | |
| 5,546,590 | * 8/1996 | Pierce | 713/323 |
| 5,606,315 | * 2/1997 | Gaskins | 340/825.34 |
| 5,652,892 | 7/1997 | Ugajin | 395/750 |
| 5,694,582 | 12/1997 | Pearce | 395/500 |
| 5,742,758 | 4/1998 | Dunham et al. | 395/186 |
| 5,748,888 | * 5/1998 | Angelo | 713/200 |
| 5,751,950 | * 5/1998 | Crisan | 713/202 |
| 5,832,214 | 11/1998 | Kikinis . | |
| 5,857,020 | 1/1999 | Peterson, Jr. | 380/56 |
| 5,867,106 | 2/1999 | Bi et al. | 340/825.31 |
| 5,896,497 | * 4/1999 | Halstead | 713/200 |
| 5,960,084 | 9/1999 | Angelo . | |
| 6,041,413 | * 3/2000 | Wang | 713/202 |

* cited by examiner

Primary Examiner—Zarni Maung
Assistant Examiner—Wen-Tai Lin
(74) Attorney, Agent, or Firm—Finnegan, Henderson, Farabow, Garrett & Dunner, L.L.P.

(57) ABSTRACT

A computer system power-on security control that does not allow a computer power source to turn on until a valid passcode is entered. The system includes a mouse intercept unit for intercepting mouse signals directed to a mouse controller in the computer system when the power source is off. A memory stores valid passcodes used to power on the computer system. A comparator unit is configured to compare received mouse signals to the stored passcodes. A power supply control unit, connected to the comparator unit, outputs a power control signal to turn on the computer system power source when the mouse signals match the stored passcode.

23 Claims, 4 Drawing Sheets

SECURITY CONTROL FOR COMPUTER POWER SUPPLY SYSTEM

RELATED APPLICATIONS

This application is a continuation-in-part of U.S. patent application Ser. No. 08/886,009 filed Jun. 30, 1997, now U.S. Pat. No. 6,041,413.

BACKGROUND OF THE INVENTION

1. Field of the Invention

The invention relates in general to a power supply controller for a computer system and, in particular, to a secure power controller for a computer system.

2. Description of Related Art

In typical microprocessor-based personal computer or workstation systems, simple mechanical on/off contact switches are used to supply or cut-off electrical power to the power supply unit of the computer systems. When the mechanical contact switch is turned on, the closed-circuit switch supplies electrical power, such as 110V AC, to the power supply circuitry which converts the AC power into the appropriate DC power. With a steady supply of all the necessary DC power, the computer system initiates its start-up sequence, and the system boots up. These mechanical contact switches are turned on and off by a human. Many computer systems have no other means to turn power-on or -off.

Many of these systems have no security. Once the main power switch is switched and maintained on, the system starts a sequence of operations. If no effective password control scheme is incorporated at either the system firmware or the operating system level, once powered up, the entire system, together with all its data, is exposed to anyone having access to the system.

Models of the Macintosh series of personal computer systems manufactured by Apple Computer Inc. of Cupertino, Calif. employ a designated key on the keyboard to control powering up and down. Though convenient, this keyboard also lacks effective security. Once a system has its power cord connected in the utility socket, anyone who can get access to the computer by depressing the power up key on the keyboard. Firmware and/or operating system level program routines similar to those mentioned above would have to be used to provide access restriction for these computer systems.

On the other hand, the ATX standard computer motherboard includes a power supply subsystem that does not rely on the simple mechanical contact switch. Instead, the ATX implements a form of soft power control under supervision of a circuitry integrated in the computer system itself. It provides power for basic power management circuitry in the computer system when the main power supply is cut off. The power management circuitry may be programmed to implement various functions of the computer system. For instance, the system can be programmed to start itself automatically at midnight when unattended by an operator so as to send international facsimile transmissions during a discount rate time period of the telephone company. The computer system also may be awakened in the evening by incoming requests for remote modem connection in order to receive file transmissions.

However, such concepts of soft power management as implemented by recent standards such as ATX, still lack the security measures. When a computer system adopting the ATX standard is started by a user (either authorized or not) by switching-on the main power switch, the power supply is then turned on, and the system initiates its start up sequence of operations. At this moment, anyone having direct access to the system has access to the data contained in the computer. Such systems are as unprotected as were the earlier generation of computers having a mechanical main power switch.

Some conventional computer systems are equipped with a firmware or operating system-level security system that requires a password for entry after the computer is powered up. Typically, the user can try a limited number of times to enter the password. If after the specified times of trial, the user still does not enter the correct password, the system simply locks and ignores all keyboard or other inputs. In this case, the user will have to turn off the power to the computer system and then turn it back on again and try entering more passwords. This process of power-on and -off must be performed repeatedly before the correct password is entered if a user wishes to keep trying to break into the system. During this process of repeated switching-on and -off of the main power supply, the computer system is exposed to increased possibilities of premature failure.

FIG. 1 shows a conventional mouse controller interface 12 that acts as an interface between the computer system motherboard 10 and its external mouse unit 20. Motherboard 10 is connected to power supply unit 30. The mouse unit 20 has a microcontroller and mouse scanning circuitry (not shown in the drawing) installed internally. Typically, serial communication is used to establish connection between the motherboard 10 of the system unit and the mouse unit 20 signals MDATA and MCLK. Signals MDATA and MCLK are used to establish a connection between the mouse unit 20 and the mouse controller 12. Power $V_{DD}$ and ground GND paths are also connected between the mouse controller 12 and mouse 20.

Existing microprocessor-based computer systems operate on power supply subsystems that do not allow, or at least do not recommend, repeated switching-on and -off during a short period of time. Some power supplies are equipped with protection circuitry that prevents them from powering-on within a specified time period of, for example, a few seconds after being turned off. Though circuit boards in a computer system can thus be protected from potential damage in successive power-on and -off sessions, other components such as disk drives are not as protected. This is because spindle motors for modem hard disk drives are not designed for repeated power changes. They are designed to be turned on with power maintained for a long period of time.

It would therefore be desirable to have a security control apparatus on the computer power supply subsystem that determines whether a user is allowed access to a computer system before powering-up the computer system. This would provide security and prevent physical damage to components in the computer system due to repeated power changes.

SUMMARY OF THE INVENTION

Systems and methods consistent with the principles of the present invention address this need by providing a system that prevents a computer system from receiving power until a valid passcode is received. The system includes a mouse intercept unit for intercepting mouse signals directed to a mouse controller in the computer system when the computer power source is off. A memory stores valid passcodes used to power on the computer system. A comparator unit is configured to compare received mouse signals to the stored passcodes. A power supply control unit, connected to the comparator unit, outputs a power control signal to turn on the computer system power source when the mouse signals match the stored passcode.

One embodiment of the present invention includes a decoder for decoding received mouse signals and a buffer or state machine for processing the decoded mouse signals.

Another embodiment of the present invention includes a memory either in combination with the computer system or the security system for storing the passcodes.

Another embodiment of the present invention includes a standby power source configured to output power to the keyboard intercept unit, comparator unit, and power supply control unit when the computer power source is off.

In a further embodiment of the present invention a NAND circuit is provided to perform a logical NAND operation on a status of a switch on the main computer and the output of the comparator unit.

A method consistent with the present invention controls power-up of a power source on a computer system having a mouse connected to a mouse controller and a memory storing passcodes. The method intercepts mouse signals directed to the mouse controller when the power source is off and compares the received mouse signals to the stored passcode. A power control signal is used to turn on the power source when the mouse signals match the stored passcode.

BRIEF DESCRIPTION OF THE DRAWINGS

The accompanying drawings, which are incorporated in and constitute a part of this specification, illustrate an embodiment of the invention and, together with the description, explain the objects, advantages, and principles of the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Figure 1:
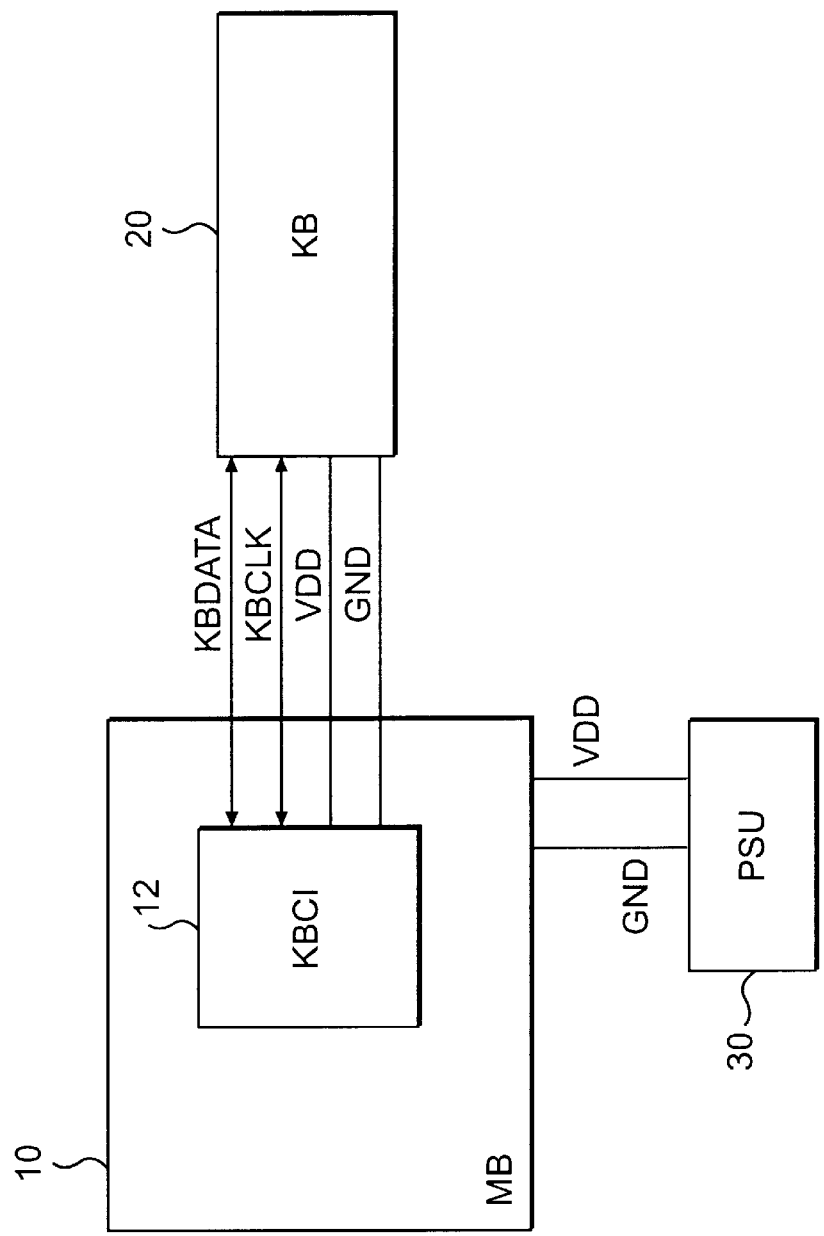
FIG. 1 is a simplified block diagram showing the circuit configuration of the mouse controller interfacing with a corresponding external mouse unit in a conventional computer system.
Figure 2:
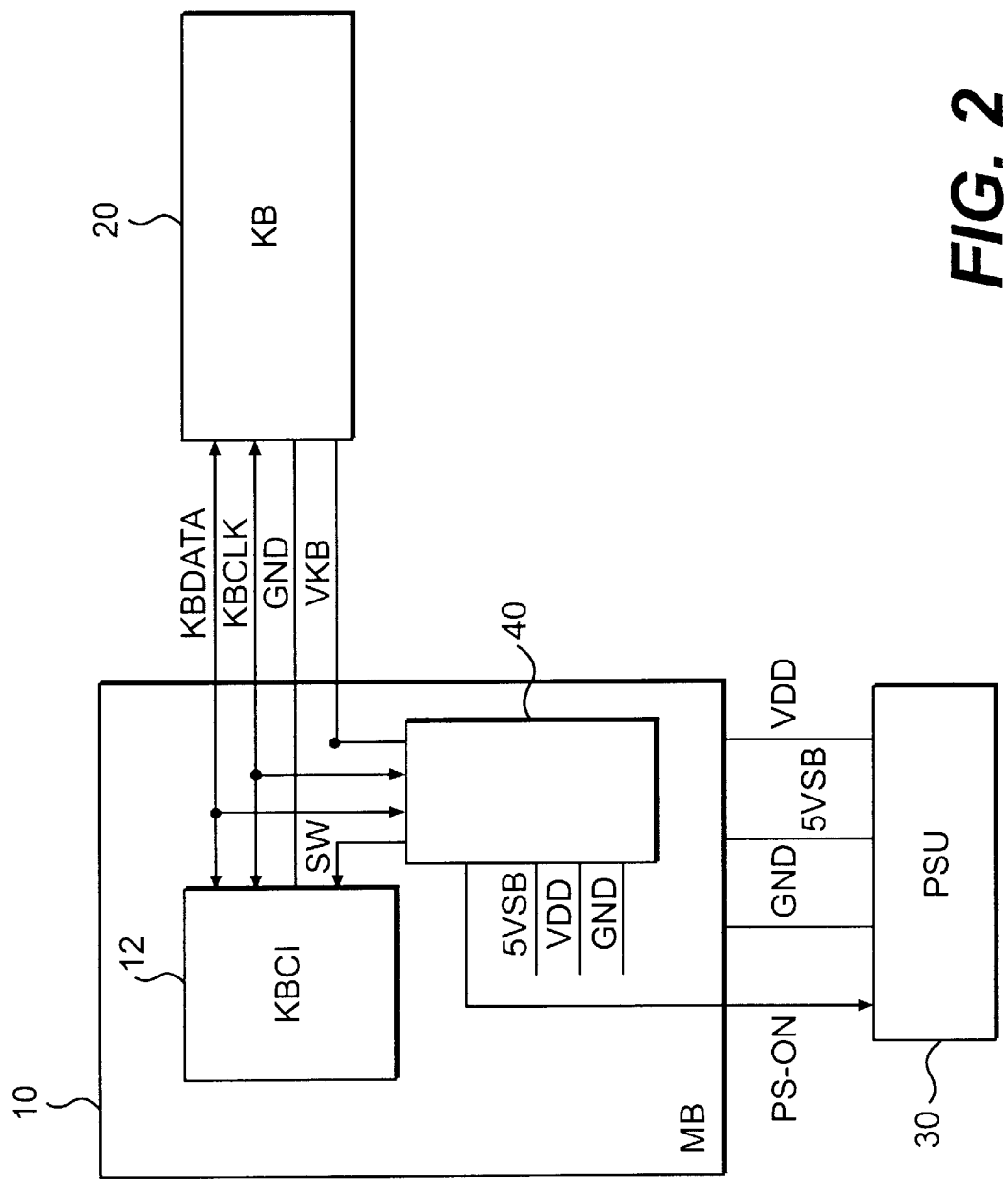
FIG. 2 is a block diagram showing the circuit configuration employing a security control apparatus connected to the mouse controller in accordance with the present invention.

Systems and methods consistent with the principles of the present invention provide a security control apparatus in combination with the typical computer system as shown in FIG. 1 to control power to the system. In one embodiment of the invention, as shown in FIG. 2, this security control apparatus 40 can be inserted between the external mouse unit 20 and the mouse controller 12 of the motherboard 10, while tapping into the signal paths connecting the two together. As illustrated, the security control apparatus 40 can be incorporated into the logic circuitry of a computer system to interact with mouse controller 12 and power supply unit 30.

Security control apparatus 40 is an independent circuit module that can intercept the mouse signals MDATA and MCLK communicated between the external mouse unit 20 and the mouse controller 12 of the computer motherboard 10. The security control apparatus 40 monitors the signal communications between the two functional blocks to see if any user has depressed a predetermined number or pattern of the buttons on mouse 20 that conforms to a valid password. The password is a predetermined stored sequence of button depressions on the mouse. An example password might include three depressions of the right mouse button followed by two of the left mouse button.

In one embodiment of the invention, when the computer is turned off, the security control apparatus 40 still maintains power-on with the power supply unit 30. The security control apparatus 40 may be powered by a standby power source, such as on the ATX motherboard, when the system is in the power-down condition. The standby power source of the ATX can provide sufficient electric current for the operation apparatus 40 in order to monitor button depressions at the mouse 20 even when the computer is turned off. The power supply unit 30 also supplies sufficient power to the external mouse unit 20 for button scanning circuitry to operate under control of the mouse microcontroller.

When a user depresses buttons on the external mouse 20 while the computer is off, the security control apparatus 40 monitors the depressed buttons and compares the sequence with a pre-stored password. If the stored password and the input button depressions match, an enabling signal is generated by the security control apparatus 40, so as to turn on the power supply unit 30, which then initiates and provides power to the entire computer system. Once the power supply unit 30 is turned on, the computer system proceeds with a normal boot up sequence. If the power supply unit 30 is on ATX power supply, a logically low-level signal sent over the PS-ON input of an ATX power supply turns on the power supply unit 30 which then powers up the computer system.

On the other hand, if the security control apparatus 40 determines that the depressed password button depressions do not match a valid passcode, the PS-ON input to the power supply 30 is kept off thereby keeping the power supply off. Therefore, any mouse entry except the correct passcode has no effect on the system and the power remains off. Regardless of how many times an intruder tries to enter a correct passcode on the external mouse unit 20, the power supply unit 30 is kept at the powered down status until a correct passcode is given. Since the power supply unit 30 is maintained in an off state, vital components of the computer system, in particular the delicate and relatively vulnerable disk subsystem, will not be repeatedly powered up and down in a rapid manner during the process of repeated passcode guessing. Potential damage to the computer components as a result of a rapid power-on and -off cycle is thereby avoided.

Security control apparatus 40 generates a control signal SW that is relayed to the mouse controller 12. When the computer system is under the power-down status, this signal allows the security control apparatus 40 to keep on intercepting the mouse signals MDATA and MCLK for monitoring the validity of any entered passcode input on the mouse 20. When the computer system is powered on successfully (i.e., via correct input of a valid passcode), the control signal SW can be used to return the normal flow of the mouse signals MDATA and MCLK to the mouse controller 12.

Security control apparatus 40 constantly monitors the button-depressing status of the external mouse unit 20 while the computer system is turned off. Standby powerline 5VSB provides power to the security control apparatus 40 while the main supply $V_{DD}$ for the computer is off. After the normal power-on of the computer system, power to the external mouse unit can switch from the standby power 5VSB to the master power $V_{DD}$. The external mouse unit may be powered by the standby power line after the normal boot up of the computer system.

Figure 3:
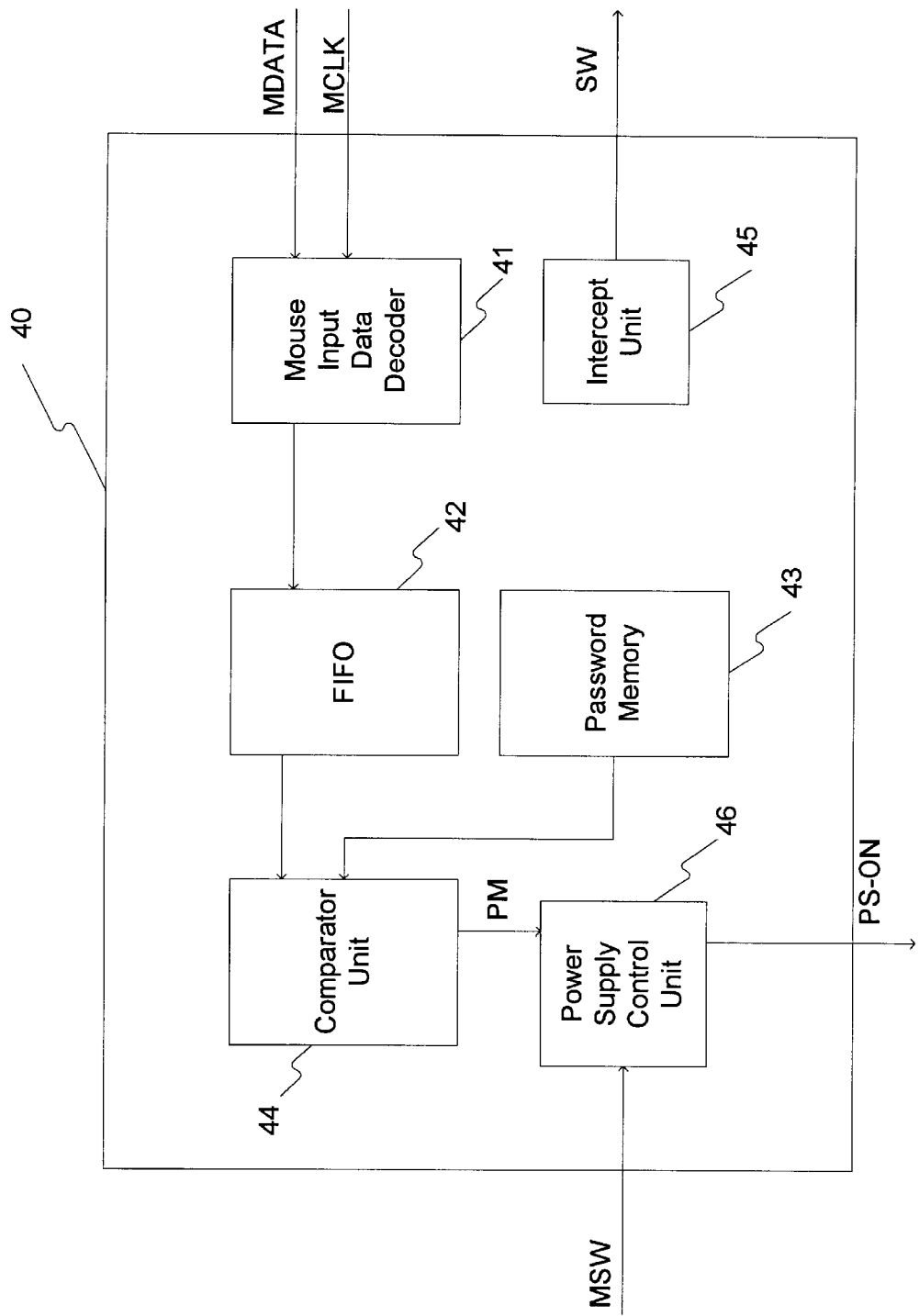
FIG. 3 is a block diagram showing the security control apparatus according to the present invention.

FIG. 3 is a block diagram of the security apparatus 40 that includes a mouse input data decoder (MDEC) 41, a first-in first-out (FIFO) buffer 42, a passcode memory 43, a compare unit 44, a mouse intercept unit 45, and a power supply control unit 46. The first-in-first-out buffer may be replaced with other known buffers. In one embodiment of the present invention the first-in-first out buffer is replace with a state machine.

The mouse intercept unit 45 generates a mouse signal intercept control signal SW based on the power-up and down condition of the computer system. Mouse intercept unit 45 is a logic circuit that generates logic signal SW with reversing logical states to represent the power-on and -off status of the computer system. When the computer system is in its powered off status, the SW signal in a first logical state is used to control the interception of the mouse signals MDATA and MCLK for monitoring. On the other hand, when the computer system is in its powered on status, the SW signal in a second logical state returns the normal mouse signal communication between the external mouse unit 20 and the mouse controller 12.

Figure 4:
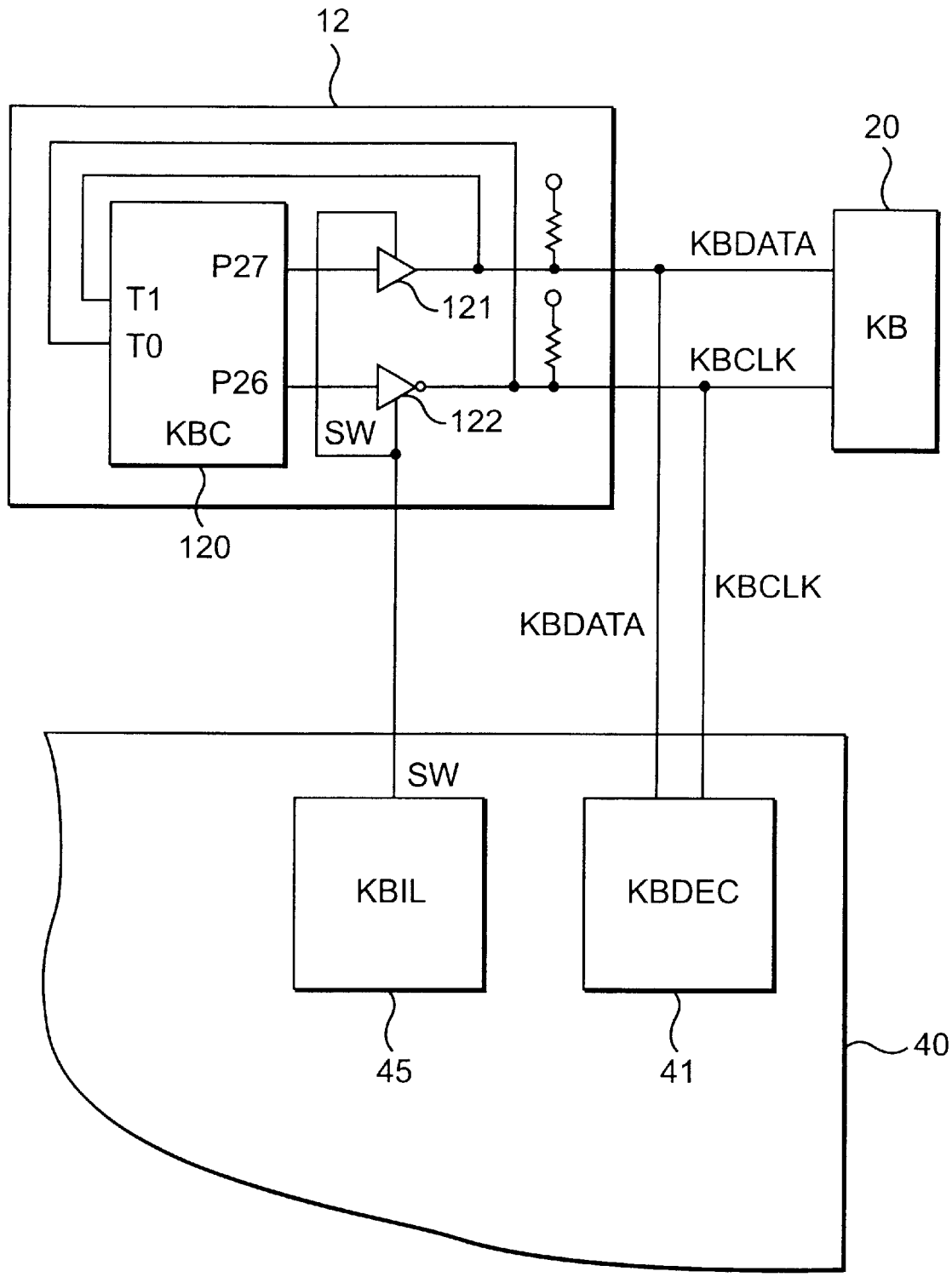
FIG. 4 is a schematic diagram showing the security control apparatus in communication with the mouse controller and mouse according to the present invention.

FIG. 4 illustrates a schematic diagram showing the circuitry configuration of the security control apparatus in accordance with one embodiment of the present invention. The mouse intercept unit 45 intercepts the mouse signals MDATA and MCLK in order to determine whether or not a valid passcode is being entered. As shown in the drawing, the mouse controller interface 12 includes a typical microcontroller 120, which, in the typical IBM-compatible systems, may be an Intel 8042/8048 8-bit microcontroller or the equivalent. A typical mouse controller interface 12 has output ports P2 and P23 that output the mouse signals MDATA and MCLK via an open-collector buffer. In an alternative embodiment, the two open-collector buffers can be replaced by a pair of three-state buffers 121 and 122.

As illustrated in FIG. 4, the two three-state buffers 121 and 122 may be powered by the same standby power line that powers the external mouse unit 20. This is because these two buffers must remain active during the power off period.

When the computer system is powered down, mouse intercept unit 45 of the security control apparatus 40 generates a control signal SW that controls whether the three-state buffers 121 and 122 are enabled or disenabled. When enabled, buffers 121 and 122 cause the mouse intercept unit 45 to intercept the mouse signals. When disabled, buffers 121 and 122 allow mouse signals to reach mouse controller 120. The buffers 121 and 122 are enabled when the main power is turned off and disabled when the main power is turned on.

In one embodiment of the present invention, the mouse intercept unit 45 is replaced by a main 5-volt power source $V_{DD}$ of the power supply unit 30. The two three-state buffers 121 and 122 may be tied directly, or via a properly selected pull-up resistor.

The data decoder 41 decodes received mouse entries as represented by the mouse signals, into the standard codes used in the computer system. These converted codes, representing the entered button depressions or mouse movements, are then sent to the first-in first-out buffer (FIFO) 42 for storage in a predetermined data format to await further processing.

Passcodes are stored in the passcode memory 43. In a preferred embodiment of the invention, this passcode memory 43 may be a non-volatile random-access memory (NVRAM) device that can maintain its stored information permanently after the removal of power. Or, in the case of an IBM-compatible computer, the passcode memory 43 may also be a designated memory space in the CMOS memory used for maintaining information that records the computer system hardware configuration. In another embodiment, the passcode memory 43 may also be a simple static random-access memory (SRAM) that has a back-up battery to maintain its memory content after the computer system is powered down.

In one embodiment, comparator unit 44 generates a passcode match signal PM, when the mouse entry and the passcode match. The power supply control unit 46 generates a power supply control signal that can be used to directly interface and control the power supply unit 30 of the computer system. For instance, in the case of an ATX power supply, this generated power supply control signal may be the logically negative PS-ON signal complying to the ATX specification which may be tied directly to the PS-ON input of the ATX power supply. In the case of the ATX power supply, a logical high-level signal at the PS-ON input keeps the power supply remained at its turned off state. On the other hand, the logical low signal on the PS-ON input will activate the power supply and brings up the computer system unconditionally.

In another embodiment, further controlling signals derived from other control logic in the computer system can be relayed to the power supply control unit 46. These additional controlling signals may be used as contributing factors in the process of the generation of a power supply control signal, the PS-ON signal, depicted in FIG. 3. For example, if the computer system is equipped with a main power switch, a signal MSW, used to designate the logical on-off status of this switch, may be input to the power supply control unit 46, as shown in FIG. 3. In the case of a logically positive convention for both the passcode match PM and the main switch status MSW signals, a logical NAND operation may be implemented on the PM and MSW signals by the power supply control unit 46 to obtain a logically negative PS-ON output indicating that both a match has occurred and the power switch is on.

While the invention has been described by way of example and in terms of preferred embodiments, it is to be understood that the invention need not be limited to the disclosed embodiments. For example, typical IBM-compatible computer systems employ a simple 8-bit microcontroller to implement the mouse interface control on the system motherboard. The typical external mouse unit used in these x86-based computers may therefore employ a microcontroller having correspondingly compatible processing capability to implement the control of the independent mouse unit. Microcontrollers at both sides of the mouse interface may be communicating to each other in a serial connection. However, other forms of communication between the two are also possible for implementation of the invention.

In addition, many modern personal computers are built around ASIC (application-specific IC) devices. The security control apparatus of the present invention may also be used with ASIC circuitry and may be included in the core logic chipsets of the computer system. Since the logic circuitry of the security control apparatus of the invention is relatively simple compared with the computer core logic, the incorporation of the inventive apparatus in the computer core logic ASIC device barely adds noticeably to the overall gate count. ASIC devices incorporating the apparatus of the invention do not add significantly to the total semiconductor fabrication cost. In addition since the security control apparatus has a relatively simple logic circuitry, minor electric power is consumed. Incorporation of the security control apparatus of the present invention is also suitable for a standby power source in power supply units such as the ATX specification.

Further, in addition to power supply unit of the ATX specification, other standards such as the NLX or PS/2, may also be used.

Finally, in another embodiment the mouse may be replaced with a keyboard on which a user enters passwords, a combination of a keyboard and a mouse on which a user enters a combination of a password and passcode, or any other computer input device that allows for entering information into a computer.

Systems and methods consistent with the principles of the present invention provide for a secure entry device that prevents a computer from powering on until a valid password is entered.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. The scope of the invention is defined by the claims and their equivalents.

What is claimed is:

1. A system for controlling power-up of a computer system having a mouse connected to a mouse controller being connected to a power source, said system comprising:

a mouse intercept unit for intercepting mouse signals directed to the mouse controller, the mouse intercept unit including means for intercepting mouse signals when the power source is off;

a comparator unit configured to compare the mouse signals to a passcode; and a power supply control unit connected to the comparator unit, for outputting a power control signal to turn on the power source when the mouse signals match the passcode.

2. The system according to claim 1 further including:

a standby power source configured to output power to the mouse intercept unit, comparator unit, and power supply control unit.

3. The system according to claim 1 further including:

a standby power source configured to output power to the mouse intercept unit, comparator unit and power supply control unit when the power source is off.

4. The system according to claim 1 further including:

a mouse input data decoder for receiving and decoding the intercepted mouse signals.

5. The system according to claim 4 further including:

a buffer connected to an output of the mouse input data decoder for storing the decoded signals.

6. The system according to claim 5 wherein said comparator unit includes means for comparing the passcode to the decoder signals stored in the buffer.

7. The system according to claim 1 further including:

a state machine connected to an output of the mouse input data decoder for processing the decoded signals.

8. The system according to claim 7 wherein said comparator unit includes means for comparing the passcode to the decoder signals processed by the state machine.

9. The system according to claim 1 wherein said power supply unit includes means for maintaining a power off to the supply unit when the passcode does not match the decoded signals.

10. The system according to claim 1 wherein the power supply control unit includes a logical NAND circuit which receives an output of the comparator unit and a logical status of a switch on the power source.

11. The system according to claim 1 wherein the mouse intercept unit includes a pair of buffers configured to receive a pair of signals from the mouse.

12. The system according to claim 1 further including a memory for storing passcodes.

13. The system according to claim 12 wherein the memory is a non-volatile random-access memory.

14. The system according to claim 12 wherein the memory is a designated memory space in a CMOS configuration memory of the computer system.

15. The system according to claim 12 wherein the memory is a static random-access memory supported by a back-up battery when the computer system is turned off.

16. A method of controlling power-up of a computer system having a mouse connected to a mouse controller and a memory storing a passcode, said computer system being connected to a power source, said method including the steps of:

intercepting mouse signals directed to the mouse controller when the power source is off;

comparing the mouse signals to the passcode; and outputting a power control signal to turn on the power source when the mouse signals match the passcode.

17. The method according to claim 16 further including the step of:

decoding the intercepted mouse signals.

18. The method according to claim 17 further including the step of:

storing the decoded signals.

19. The method according to claim 18 wherein said step of comparing includes the step of comparing the passcode to the stored decoded signals.

20. The method according to claim 16 further including maintaining a power off to the supply unit when the passcode does not match the decoded signals.

21. A system for controlling power-up of a computer system having a mouse connected to a mouse controller, said computer system connected to a power source, said system comprising:

a mouse intercept unit for intercepting the mouse signals communicated between the mouse controller and the mouse when the computer system is powered off;

a mouse input data decoder for receiving and decoding the mouse signals intercepted by the mouse intercept unit;

a buffer connected to the output of the mouse input data decoder for storing the decoded data of the mouse signals;

a passcode memory for storing the preset passcode designated for authorized power up of the computer system;

a comparator unit having each of two inputs connected to the output of the buffer and the passcode memory, respectively, the comparator unit comparing the mouse signals and the preset passcode and generating a signal indicating a matching condition of the comparison; and a power supply control unit for generating a control signal based on the logical status of the matching condition in order to control a power up of the power supply of the computer system.

22. The system according to claim 21 wherein the power supply control unit includes means for initiating the power supply to supply power to the computer system when the comparator unit generates a positive matching condition as a result of the comparison, and maintaining the power supply at the power off status when the comparator unit generates a negative matching condition as a result of the comparison.

23. A power security system for controlling power-up of a computer having a mouse and a stored passcode, the power security system comprising:
- a mouse intercepting unit for intercepting mouse signals from the mouse when the computer system is power off; and
- a comparator unit for comparing the intercepted mouse signals with the stored passcode, wherein if the mouse signals match the passcode, the comparator unit exports a signal to fully turn on the computer system.

* * * * *